May 13, 1952          P. J. KACSOR          2,596,247
FISHING ROD HANDLE AND HOLDER THEREFOR
Filed March 2, 1948
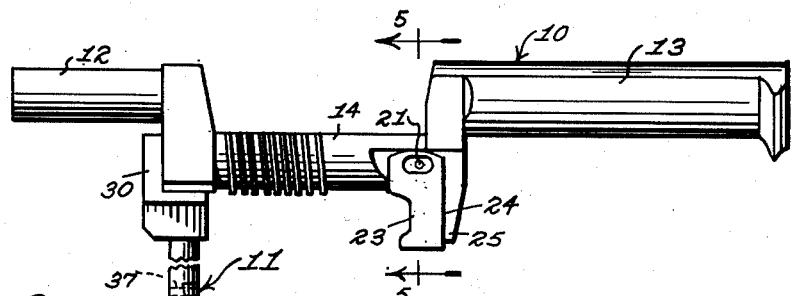
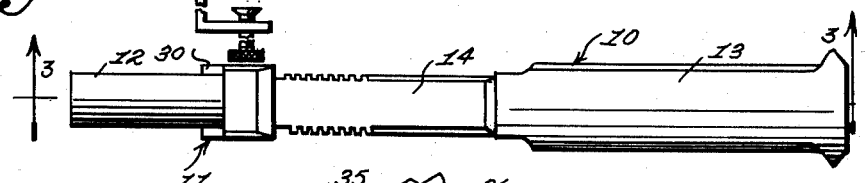
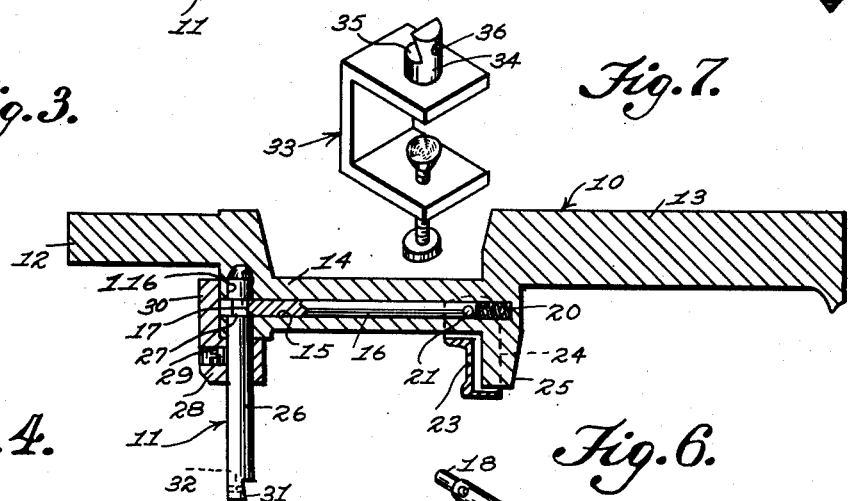
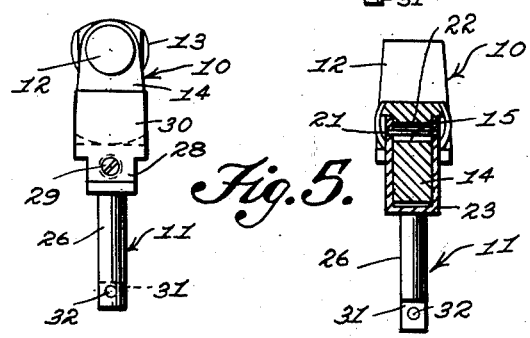
INVENTOR.
Paul J. Kacsor
BY
ATTORNEYS Patented May 13, 1952

2,596,247

UNITED STATES PATENT OFFICE 2,596,247

FISHING ROD HANDLE AND HOLDER THEREFOR

Paul J. Kacsor, Cleveland, Ohio

Application March 2, 1948, Serial No. 12,634

1 Claim. (Cl. 248—42)

My invention relates to holders for fishing rods, and more particularly to a combined fishing rod handle and holder therefor, whereby the necessity for holding the rod in the angler's hands constantly is eliminated, but which at the same time requires substantially little modification of conventional fishing rods. As is well known, in normal fishing there are frequent periods of inaction and occasions arise when it is desirable for the fisherman to release his grip upon the rod. On such occasions, in the absence of an adequate holder for the rod, it is relatively easy to lose the rod overboard, especially if during the released period a fish takes the bait.

With the foregoing in view, it is an object of my invention to provide an improved holder for fishing rods.

A further object is to provide an improved combined fishing rod handle and holder for the same.

A further object is to provide a combined fishing rod handle and holder therefor which includes a latch bolt carried by the handle and engageable with a latch detent formed on the holder, together with means for quickly retracting the bolt to disengage the handle from the holder.

Other objects and advantages reside in the particular structure of the invention, and of the elements thereof, and/or in the combination and arrangement of the several parts thereof, all of which will be readily understood by those skilled in the art upon reference to the attached drawing in connection with the following specification, wherein the invention is shown, described and claimed.

In the drawing:

Figure 1 is an elevation of the combined fishing rod handle and holder according to the invention;

Figure 2 is a plan view thereof;

Figure 3 is a longitudinal vertical section taken substantially on the plane of the line 3—3 of Figure 2;

Figure 4 is an end elevation thereof looking from the left of Figure 1;

Figure 5 is a transverse vertical section taken substantially on the plane of the line 5—5 of Figure 1;

Figure 6 is a perspective view of an element of the invention apart from the rest of the structure;

Figure 7 is a perspective view of an element of the structure apart from the rest of the structure.

Referring specifically to the drawing, wherein like reference characters have been used throughout the several views to designate like parts, 10 designates generally a fishing rod handle and 11 a holder therefor. In the form illustrated, the handle 10 comprises a forwardly-disposed rod-receiving portion 12, a rearwardly-spaced and aligned grip portion 13, and an intermediate reel-seat-providing portion 14 connecting the portions 12 and 13 together. The reel seat-providing portion 14 is offset relative to the rod-receiving and grip portions 12 and 13. While I have shown a particular form of fishing rod handle, it is to be understood that the device according to the invention is readily adaptable to other forms of fishing rod handles.

A portion of the handle 10, in this instance the off-set reel seat-providing section 14, is formed to provide a pair of intersecting sockets 15 and 116. The socket 15 extends longitudinally of the section 14, while the socket 116 extends vertically thereof in the region of the rod-mounting section 12 of the handle. The latch bolt 16 is slidable in the socket 15 and has its forward end formed to provide a latch dog 17. The rear end of the latch bolt 16 is reduced, as at 18, and an adjacent portion thereof is transversely bored, as at 19. A coil spring 20 surrounds the reduced end 18 of the latch bolt and seats against the floor of the socket 15, whereby to load the latch bolt for movement in a forward direction. The reel seat-providing section 14 is formed to provide a transverse slot 22 intersecting the socket 15 in the region of the floor thereof and slidably receives a transverse pin 21 which extends through the hole 19 in the rear end of the latch bolt. The free ends of the pin 21 extend laterally outwardly of the section 14 and are operatively connected in any suitable manner to the upper portion of a trigger 23. The trigger 23 may be provided with rearwardly-directed flanges 24 which partially encircle a depending boss 25 formed on the reel seat-providing section 14. This arrangement guides the trigger for movement relative to the rod handle 10. As is readily apparent from Figure 3, when the trigger is pulled rearwardly, it carries with it the bolt 16, such action being permitted by the sliding movement of the pin 21 in the slot 22 of the section 14.

The holder 11 includes a stem 26 which is slidably receivable in the vertically-disposed socket 116 aforesaid. An upper portion of the stem 26 is formed to provide an annular groove therein which provides a latch detent which is engageable with the latch dog 17 of the latch bolt 16 aforesaid. This structure permits the latch bolt to releasably lock the holder stem 26 in the socket 116. The stem 26 in the instance shown is cylindrical, whereby to be slidably and rotatably received in the socket 116. In like manner, the provision of the annular detent 27 permits a swivel action between the rod handle 10 and holder 11, even while the latch is engaged. However, at times it may be necessary to eliminate said swivel action, whereby I provide a collar 28 which is slidable on the stem 26 and secured thereon by a set screw 29. The collar 28 includes an integral upstanding flange 30 which is engageable with the flat forward end of the reel seat-providing section 14, whereby to prevent relative rotation of the rod 10 and holder 11. At the same time, the collar 30 permits free movement of the rod 10 in a disengaging direction from the holder 11.

The lower end of the stem 26 is formed to provide means for detachably connecting the stem to means for attaching the holder 11 to a support. In the form shown, the lower end of the stem 26 is transversely notched, as at 31, and likewise provided with a transverse bore 32 extending through said notch. A clamp 33 of well known form is provided with a stem 34, the upper end of which is notched, as at 35, so as to be complementary to the notched lower end of the stem 26. In like manner, also, the stem 34 of the clamp 33 is provided with a transverse bore 36 which is adapted to align with the bore 32 of the stem 26 when the parts are assembled. Such aligned bores 32 and 36 may be interiorly threaded, whereby to receive screw means for detachably securing the stem 26 to the clamp 33.

It follows from the foregoing that the fisherman may release his grip on the rod as much as desired without any danger of the rod being lost overboard, provided the latch dog 17 is engaged with the latch detent 27 of the holder stem 26. However, in the event of a strike, it is but a matter of split seconds to press the trigger 23, whereby to retract the latch bolt 16 and disengage the rod 10 from the holder 11 by an upward movement of the rod. Inasmuch as this action is the normal action of a fisherman after a strike to set the hook in the fish, a virtually automatic release of the rod from the holder is accomplished by virtue of the particular arrangement of parts set forth in the foregoing description.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

A support for a fishing rod including a horizontally disposed handle having a vertically disposed socket extending partially therethrough from the underside thereof, there being a longitudinally extending slot in said handle having one end terminating in said socket, a stem slidably mounted in said socket and having one end adapted to be secured to a supporting surface, said stem having an annular recess extending transversely thereof in aligned relation with the slot in said handle, means slidably mounted within the slot and having one end engageable with the recess in said stem for rotatably securing the latter within the socket, said last named means embodying a latch bolt having a latch dog adjacent said one end of the latter, resilient means positioned adjacent the other end of said slot and operatively connected to the other end of said bolt for biasing said latch dog into engagement with the recess in said stem, a depending boss spaced from said vertically disposed socket and secured to said underside of said handle, a pin disposed transversely of said latch bolt contiguous to and spaced from said other end thereof and secured thereto, the free ends of said pin projecting through opposed longitudinally extending slots provided in said handle and being slidable therealong, and trigger means movable toward and away from said depending boss and operatively connected to said pin for urging said latch dog away from said recess in response to the movement of said trigger means toward said depending boss.

PAUL J. KACSOR.

REFERENCES CITED

The following references are of record in the file of this patent:

UNITED STATES PATENTS

| Number | Name | Date |
|---|---|---|
| 374,737 | Geils | Dec. 13, 1887 |
| 620,616 | Shoemaker | Mar. 7, 1899 |
| 1,805,014 | Schalk | May 12, 1931 |
| 2,287,641 | Russell | June 23, 1942 |
| 2,289,592 | Riedi | July 14, 1942 |